(12) United States Patent
Chang et al.

(10) Patent No.: US 8,577,167 B2
(45) Date of Patent: Nov. 5, 2013

(54) IMAGE PROCESSING SYSTEM AND SPATIAL NOISE REDUCING METHOD

(75) Inventors: Wei-Na Chang, Tao Yuan (TW);
Chia-Wei Yu, Tai Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 302 days.

(21) Appl. No.: 13/074,412

(22) Filed: Mar. 29, 2011

(65) Prior Publication Data

US 2011/0243472 A1  Oct. 6, 2011

(30) Foreign Application Priority Data

Mar. 30, 2010  (TW) ................................ 99109514 A

(51) Int. Cl.
*G06K 9/40*  (2006.01)
(52) U.S. Cl.
USPC ........... 382/261; 382/260; 382/262; 382/263; 382/264; 382/274
(58) Field of Classification Search
USPC .................................................. 382/264, 266
See application file for complete search history.

(56) References Cited

U.S. PATENT DOCUMENTS

| | | | | |
|---|---|---|---|---|
| 4,761,819 A * | 8/1988 | Denison et al. | ............... | 382/261 |
| 4,783,839 A * | 11/1988 | Bamber | ............... | 382/261 |
| 5,081,692 A * | 1/1992 | Kwon et al. | ............... | 382/263 |
| 5,461,655 A * | 10/1995 | Vuylsteke et al. | ............... | 378/62 |
| 5,561,724 A * | 10/1996 | Kido et al. | ............... | 382/264 |
| 5,594,807 A * | 1/1997 | Liu | ............... | 382/128 |
| 5,764,307 A * | 6/1998 | Ozcelik et al. | ............... | 348/608 |
| 5,825,936 A * | 10/1998 | Clarke et al. | ............... | 382/261 |
| 5,852,475 A * | 12/1998 | Gupta et al. | ............... | 348/606 |
| 5,926,577 A * | 7/1999 | Kasahara et al. | ............... | 382/266 |
| 6,014,469 A * | 1/2000 | Eschbach | ............... | 382/261 |
| 6,360,021 B1 * | 3/2002 | McCarthy et al. | ............... | 382/254 |
| 6,427,031 B1 * | 7/2002 | Price | ............... | 382/264 |
| 6,704,437 B1 * | 3/2004 | He et al. | ............... | 382/128 |
| 6,757,442 B1 * | 6/2004 | Avinash | ............... | 382/274 |
| 7,167,594 B2 * | 1/2007 | Ruol et al. | ............... | 382/266 |
| 7,254,277 B2 * | 8/2007 | Kempf et al. | ............... | 382/260 |
| 7,388,621 B2 * | 6/2008 | Hsu | ............... | 348/606 |
| 7,729,555 B2 * | 6/2010 | Chen et al. | ............... | 382/261 |

(Continued)

FOREIGN PATENT DOCUMENTS

CN           101087365 A       12/2007

OTHER PUBLICATIONS

Qui, Fang et al, "Speckle Noise Reduction in SAR Imagery Using a Local Adaptive Median Filter", GIScience and Remote Sensing, 2004, 41, No. 3, pp. 244-266.*

(Continued)

*Primary Examiner* — Gandhi Thirugnanam
(74) *Attorney, Agent, or Firm* — Muncy, Geissler, Olds & Lowe, PLLC

(57) ABSTRACT

The invention discloses an image processing system and method thereof. The image processing system includes an local variance estimator, a noise detector, a spatial de-noise filter. The local variance estimator estimates each pixel of an input image signal to separately output a local variance value of each pixel, and generates a noise threshold according to the local variance values. The noise detector determines which pixel indicates noise or image according to the noise threshold. The spatial de-noise filter filers the pixel indicating noise to generate an output image signal.

13 Claims, 5 Drawing Sheets

(56) References Cited

U.S. PATENT DOCUMENTS

| | | | |
|---|---|---|---|
| 8,249,355 B2 * | 8/2012 | Bohm et al. | 382/199 |
| 2004/0125113 A1 * | 7/2004 | Kempf et al. | 345/611 |
| 2005/0265605 A1 * | 12/2005 | Nakamoto et al. | 382/209 |
| 2007/0147697 A1 * | 6/2007 | Lee et al. | 382/260 |
| 2007/0269129 A1 * | 11/2007 | Kempf et al. | 382/268 |
| 2008/0008396 A1 * | 1/2008 | Kisilev et al. | 382/272 |
| 2008/0008397 A1 * | 1/2008 | Kisilev | 382/275 |
| 2009/0154826 A1 * | 6/2009 | Park et al. | 382/260 |
| 2009/0285461 A1 * | 11/2009 | Bohm et al. | 382/128 |
| 2009/0327386 A1 * | 12/2009 | Schoenblum | 708/400 |
| 2011/0019094 A1 * | 1/2011 | Rossignol et al. | 348/607 |
| 2011/0243472 A1 * | 10/2011 | Chang et al. | 382/264 |
| 2011/0249299 A1 * | 10/2011 | Wu et al. | 358/3.26 |

OTHER PUBLICATIONS

"Speckle Noise Reduction in SAR Imagery Using a Local Adaptive Median Filter," byFang Qiu, et al., GIScience and Remote Sensingm 2004, vol. 41, No. 3, pp. 244-266.

* cited by examiner

IMAGE PROCESSING SYSTEM AND SPATIAL NOISE REDUCING METHOD

BACKGROUND OF THE INVENTION (a) Field of the Invention

The invention relates to an image processing system and the method thereof, particularly to an image processing system and the method thereof for eliminating noises and remaining image details on an image.

(b) Description of the Related Art

FIG. 1 shows a schematic diagram illustrating an prior image processing system. Generally, an image processing system 10 includes a low-pass filter for removing noises on an image. The low-pass filter filters out the high-frequency noises from the input image signal Vi but remains the low-frequency portion of the input image signal Vi to generate an output image signal Vo, thereby producing the function of removing noises on an image.

However, in the case of eliminating spatial noises on an image, signal processing method according to prior art, such as using a prior low-pass filter for filtering, not only eliminates noises but also makes the image blurred. The prior signal processing method cannot achieve the effect of eliminating noises and remaining image details at the same time. Thus, the image quality becomes worse.

BRIEF SUMMARY OF THE INVENTION

In light of the above-mentioned problem, one object of the invention is to provide an image processing system and an spatial noise reducing method that can not only eliminate spatial image noises but also remain image details.

One embodiment of the invention provides an image processing system, comprising an local variance estimator, a noise detector and a spatial de-noise filter. The local variance estimator estimates each pixel of an input image signal to separately output a local variance value of each pixel of the input image signal. Then, the local variance estimator generates a noise threshold according to the state of the local variance values. The noise detector, coupled to the local variance estimator, determines whether a pixel of the input image signal indicates a noise or an image according to the noise threshold. The spatial de-noise filter, coupled to the noise detector, filters out the pixels indicating noises to generate an output image signal.

Furthermore, another embodiment of the invention provides an image processing system, comprising an local variance estimator, a noise detector, and a spatial de-noise filter. The local variance estimator receives an input image signal and the input image signal includes a plurality of pixels. The local variance estimator estimates each pixel of an input image signal to separately output a local variance value of each pixel of the input image signal. Then, the local variance estimator generates a noise threshold according to the state of the local variance values. The noise detector receives the input image signal, and compares the local variance value of each pixel of the image signal with the noise threshold to generate a comparison result. The noise detector further labels the flag value of each pixel of the input image signal according to the result comparison to thereby generate a flag distribution signal. The spatial de-noise filter receives the input image signal and the flag distribution signal. The spatial de-noise filter sets weight to be multiplied to each pixel of the input image signal according to flag values of each pixel of the input image signal indicated by the flag distribution signal, thereby generating an output image signal.

Another embodiment of the invention provides an image processing system, comprising an local variance estimator, a noise detector, and a spatial de-noise filter. The local variance estimator receives an input image signal, wherein the input image signal includes a plurality of pixels. The local variance estimator divides a first preset number of pixels into a plurality of first regions, separately calculates the local variance value of each pixel of each first region, and determines a noise threshold according to the state of the local variance values. The noise detector receives the input image signal; divides a second preset number of pixels into a plurality of second regions; separately calculates the local variance value of each pixel of each second region; and determines if each pixel is labeled with a flag according to the result of comparing the local variance value of each pixel with the noise threshold, thereby generating a flag distribution signal. The spatial de-noise filter receives the input image signal and the flag distribution signal, and then sets the weight to be multiplied to each pixel of each second region according to the flag distribution signal to generate an output image signal.

Another embodiment of the invention provides an spatial noise reducing method, comprising the following steps. At first, each pixel of an input image signal is estimated to separately output a local variance value of each pixel and a noise threshold is generated according to the state of the local variance values. Then, according to the noise threshold, whether a pixel indicates a noise or image is determined. Finally, the pixel(s) indicating a noise is filtered to thereby generate an output image signal.

The technique of embodiments calculates the local variance values of each pixel and its adjacent pixels of an input image signal to acquire the degree of variance between pixels in the whole image and then uses the degree of variance to determine that each pixel is either noises or image details (such as an image border/boundary) on an image. Then, the weight of each pixel is adjusted correspondingly to eliminate noises and enhance the border or boundary on an image so that the problem in the prior art can be solved, and the effect of eliminating noises and remaining image details at the same time can be achieved.

DETAILED DESCRIPTION OF THE INVENTION

Figure 1:
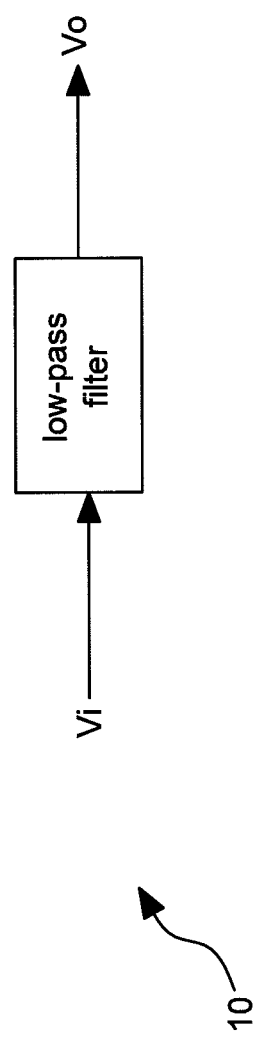
FIG. 1 shows a schematic diagram illustrating an image processing system according to the prior art.
Figure 2A:
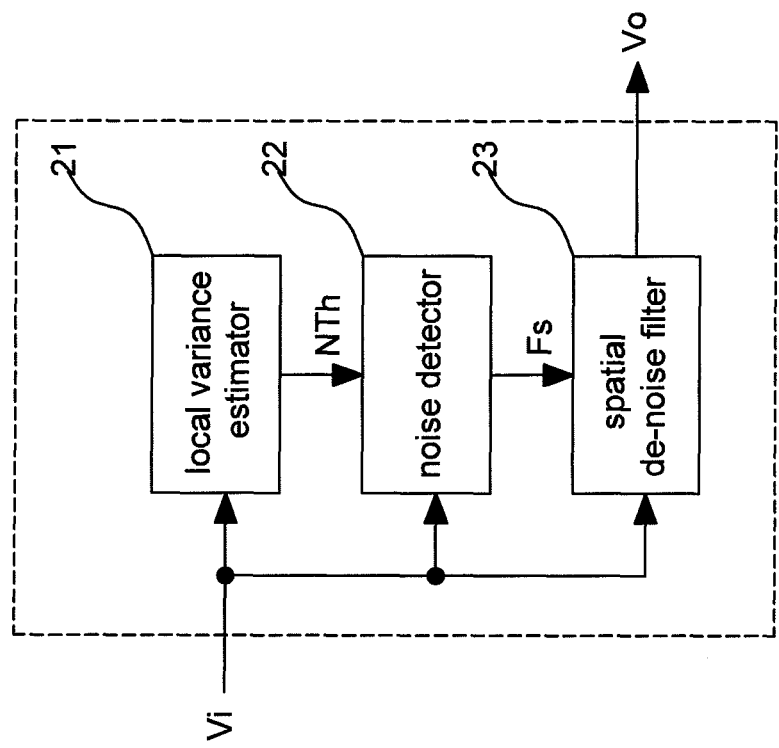
FIG. 2A shows a schematic diagram illustrating an image processing system according to one embodiment of the invention.
Figure 2B:
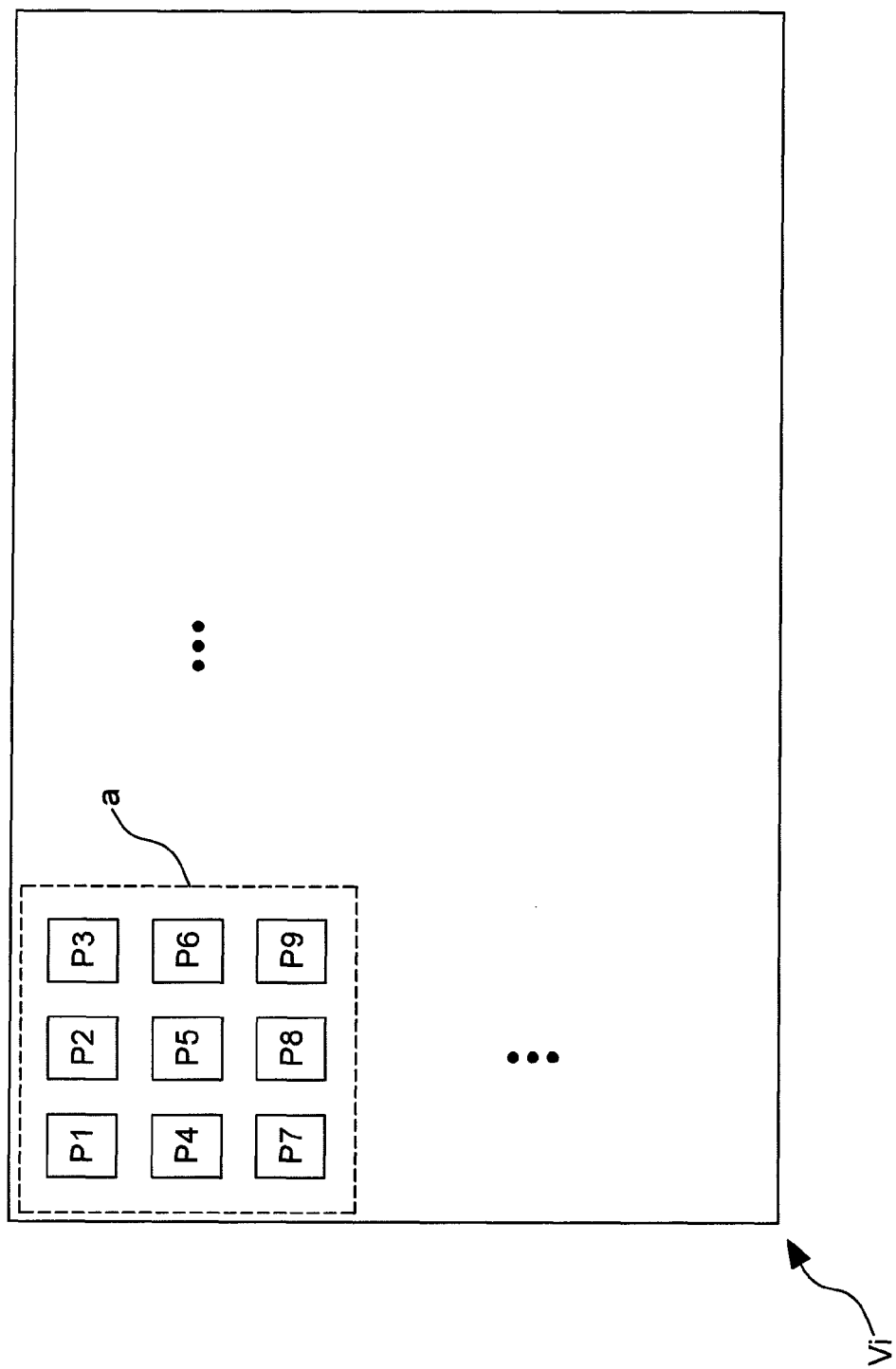
FIG. 2B shows a schematic diagram illustrating one of the processing steps shown in FIG. 2A.

FIG.2A shows a schematic diagram illustrating an image processing system according to an embodiment. The image processing system 20 may be applicable to reduce noises of a spatial image. The image processing system 20 can remove the noises and preserve the image details concurrently.

The image processing system 20 includes an local variance local variance estimator 21, a noise detector 22, and a spatial de-noise filter 23.

The local variance estimator 21 estimates each pixel of an input image signal Vi (for example, each pixel in a frame) to separately output a local variance value of each pixel, and generate a noise threshold Th according to the state of the local variance values.

In an embodiment, the state of the local variance values of the input image signal Vi may be determined based on the maximum local variance value among all or part of the pixels and/or the average local variance value among all or part of the pixels.

In an embodiment, as shown in FIG. 2A, the local variance estimator 21 may calculate the local variance value of a pixel according to its adjacent pixels in the input image signal Vi. For example, the number of the pixel and its adjacent pixels may set to be number n where n is a positive integer and larger than 2. In the figure, local variance estimator 21 surrounds 9 pixels (n=9) a region "a" to calculate the local variance value of the pixel P5. It should be noted that the local variance value may represent the degree of variance of pixels in the region"a" centered at the pixel P5.

The processing step (a) of the local variance estimator 21 is to calculate the local variance value and acquire the related reference values to represent the state of the local variance values. The local variance estimator 21 adds the pixel values of the nine pixels P1~P9 in the region "a" to get a sum=P1+P2+P3+P4+P5+P6+P7+P8+P9. The local variance estimator 21 subtracts the sum from nine times each pixel value to get a difference, and takes the absolute value of the difference to get an absolute difference value. The following nine absolute difference values can be obtained by:

$v\_tr = \text{abs}(9*P1 - \text{sum});$ $v\_tm = \text{abs}(9*P2 - \text{sum});$ $v\_tl = \text{abs}(9*P3 - \text{sum});$ $v\_mr = \text{abs}(9*P4 - \text{sum});$ $v\_mm = \text{abs}(9*P5 - \text{sum});$ $v\_ml = \text{abs}(9*P6 - \text{sum});$ $v\_br = \text{abs}(9*P7 - \text{sum});$ $v\_bm = \text{abs}(9*P8 - \text{sum});$ and $v\_bl = \text{abs}(9*P9 - \text{sum}).$ Then, the local variance estimator 21 sums the absolute difference value of each pixel up to obtain the local variance value "var" of the region "a" centered at the pixel P5, where var=v_tr+v_tm+v_tl+v_mr+v_mm+v_ml+v_br+v_bm+v_bl.

By following the above method, the local variance estimator 21 acquires the local variance value "var" of each pixel in a frame of the input image signal Vi.

Further, the local variance estimator 21 calculates related reference values which are represent the state of the local variance values. In an embodiment, after the local variance value of each pixel is calculated in the input image signal Vi, the maximum local variance value in the local variance values of all the pixels may be selected and the average local variance value may be calculated by summing all the local variance values and taking the average by the local variance estimator 21.

The processing step (b) of the local variance estimator 21 is to generate a noise threshold NTh where the noise threshold NTh may be generated from the following two methods. The first one is to fill in a preset number of the noise threshold NTh by preset software; the second one is to compare the above maximum local variance value with the above average local variance value to thereby generate the noise threshold NTh.

The above two methods to calculate the maximum local variance value and the average local variance value are described as follow paragraphs. At first, an equation (1) is as follows:

$$NTh = \text{CP\_En\_Sw\_Noise\_Th1?CP\_Noise\_Th1:} \quad (1)$$

$$((\text{CP\_Max\_Local\_Var}/\text{CP\_Mean\_Local\_Var} \Leftarrow$$

$$\text{CP\_Var\_Ratio\_Th1})?$$

$$(\text{CP\_Max\_Local\_Var} + \text{CP\_Mean\_Local\_Var})/2:$$

$$2*\text{CP\_Mean\_Local\_Var});$$

where NTh1 represents the noise threshold, CP_En_Sw_Noise_Th1 represents the preset number filled in by the preset software in the first method, and CP_noise_Th1 represents the preset value obtained from comparison in the second method.

Specifically, the second method is to divide the maximum local variance value CP_Max_Local_Var by the average local variance value CP_Mean_Local_Var to obtain a first ratio and then to compare the first ratio with a preset temporary value CP_Var_Ratio_Th1.

If the first ratio is smaller than or equal to the preset temporary value CP_Var_Ratio_Th1, it means that the pixel value of each adjacent pixel is relatively close to each other and thus the average of the maximum local variance value (CP_Max_Local_Var) and the average local variance value (CP_Mean_Local_Var) (the sum of the two values divided by 2) may be selected as the noise threshold NTh.

On the contrary, if the first ratio is larger than or equal to the preset temporary value CP_Var_Ratio_Th1, it means that the pixel value of each adjacent pixel is relatively far from each other and thus two times the average local variance value (CP_Mean_Local_Var) may by selected as the noise threshold NTh.

According to the above mentioned method, the local variance estimator 21 can calculate the current noise level of each pixel in an input image signal Vi. Generally, the maximum local variance value is at the edge of an image frame. As the average local variance value is closer to the maximum local variance value, the noise value is closer to the pixel value. Thus, the local variance estimator 21 may set a smaller value for the noise threshold NTh. For example, the local variance estimator 21 averages out the maximum local variance value and the average local variance value at a first value. The local variance estimator 21 may select the first value for the noise threshold NTh.

As the difference between the maximum local variance value and the average local variance value is larger, it means the difference between the noise value and the pixel value is larger. Thus, the local variance estimator 21 may set a larger value for the noise threshold NTh. For example, the local variance estimator 21 selects a multiple of the average local variance value for the noise threshold NTh. Wherein the pixel value below the noise threshold is a noise and the pixel value above the noise threshold is the edge or boundary on the image of the input image signal Vi.

Figure 2C:
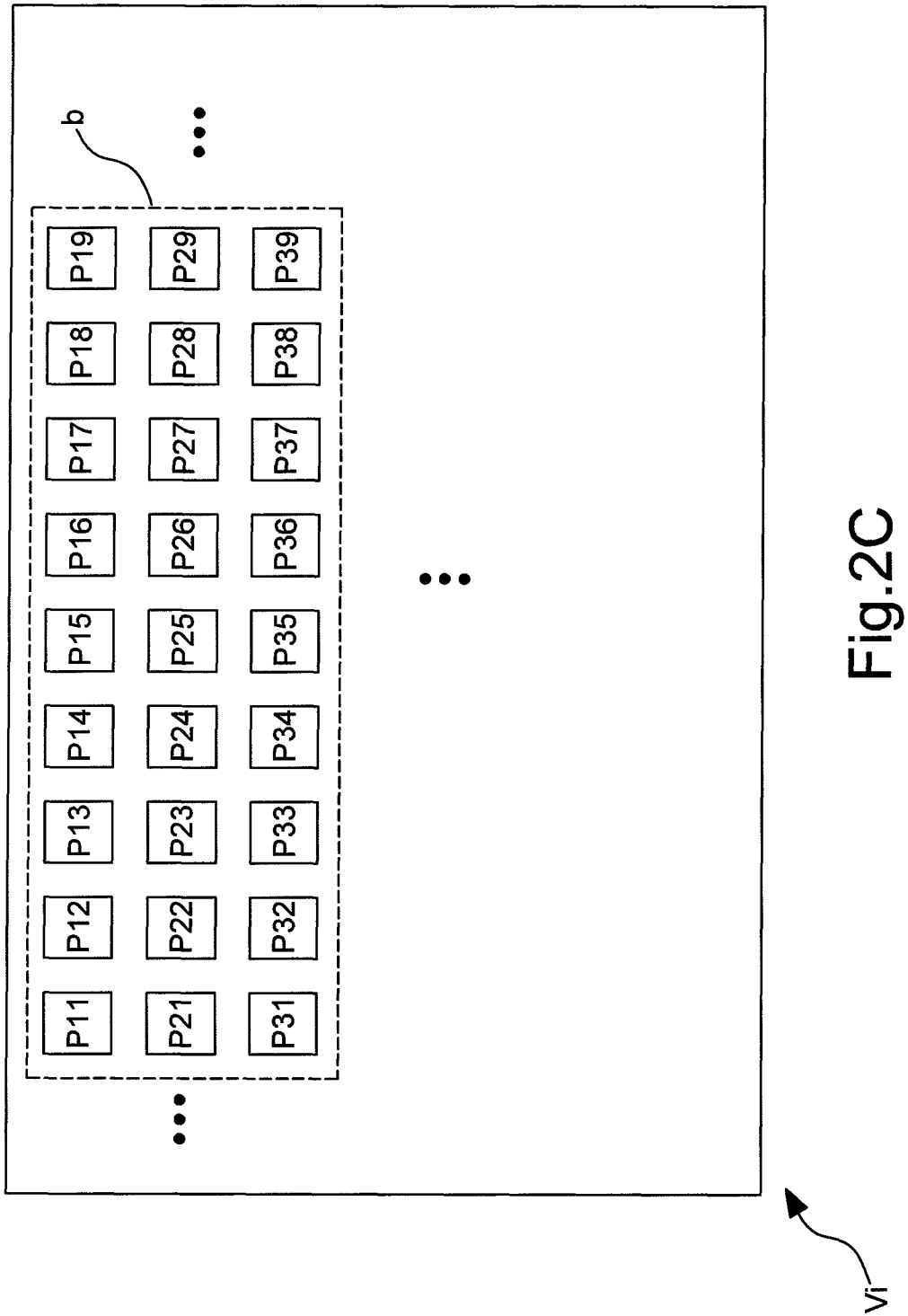
FIG. 2C shows a schematic diagram illustrating one of the processing steps shown in FIG. 2A.

Please refer to FIGS. 2A and 2C. The noise detector 22 receives the input image signal Vi, the noise threshold NTh and the local variance value of each pixel in the input image signal Vi. Further, the noise detector 22 determines a flag value for each pixel in the input image signal Vi according to the noise threshold NTh and the local variance value, or determines whether which pixel should be labeled with a flag or not. Please note that the total number of each pixel and its adjacent pixels may be a number of n, where n is a positive number and larger than 2. For example, as shown in FIG. 2C, 27 pixels (n=27) are surrounded as a region "b". The local variance estimator 21 may calculate the local variance value of the pixel P25 in the region "b".

Please note that the function of the flag value of a pixel in the input image signal Vi may indicate the pixel value of the pixel is really the edge or boundary but not a noise. A pixel without a labeled flag or with a flag value of 0 or a preset value for indicating no image detail is considered a noise.

In an embodiment, the noise detector 22 assumes that a 3*9 region is used for each pixel, as shown by the region "b" of the figure. Using the pixel P25 as an example, the pixels P11~P39 are taken as one region. A procedure of labeling the flags of the pixels in the region "b" by the noise detector 22 are described as follows:

At first, the step of flag labeling (a) is: to calculate the pre-pixel flag prepixel flag.

Further, viewing from the center x (pixel P25), the following equations are used to calculate the pre-pixel flag pre_pixel_flag of the pixel P25.

if($x<x\_center$)

Pre_Pixel_Flag($x$)=var($x$)>NTh && var($x-1$)>NTh1;

Else if($x>x\_center$)

Pre_Pixel_Flag($x$)=var($x$)>NTh && var($x+1$)>NTh;

Else Pre_Pixel_Flag($x$)=0;  (2)

In the above, Pre_Pixel_Flag(x) is the pre-pixel flag of the pixel x, x_center represents the center pixel, x represents the adjacent pixel of the x_center pixel, var(x) represents the local variance value of the pixel x, and var(x−1) or var(x+1) represents the local variance value of the adjacent pixel of the pixel x.

The above equation indicates that the pixel P24 (x<x_center) may be labeled with a pre pixel flag if the local variance value (var(x)) of the first pixel P24 (x<x_center) on the left hand side of the center pixel P25 (x_center) is larger than the noise threshold, and the local variance value (va(x−1)) of the second pixel P23 on the left hand side is also larger than the noise threshold. If the local variance value (var(x)) of the first pixel P26 (x>x_center) on the right hand side of the center pixel P25 (x_center), and the local variance value (va(x+1)) of the second pixel P27 on the right hand side are both larger than the noise threshold, the pixel P26 (x>x_center) may be labeled with a pre pixel flag Pre_Pixel_Flag. If neither of the above two cases is satisfied, the flags of the pixels P24 and P26 are labeled with 0 or are not labeled. After that, according to the whole scan line Y (the middle line P21~P29), whether a pixel is a pre pixel flag is calculated.

The step of flag labeling (b) is: to calculate pixel_flag.

Viewing from the center x, the following equations are used to calculate the pixel flag Pixel_Flag.

If($x<x\_center$)

Pixel_Flag($x$)=max(Pre_Pixel_Flag($x'$)), $x'=x$~$x$_center−1;

Else if($x>x\_center$)

Pixel_Flag($x$)=max(Pre_Pixel_Flag($x'$)),$x'=x$_center+1~$x$;

Else Pixel_Flag($x$)=0;  (3)

In the above, Pixel_Flag(x) represents the pixel flag and x~c_center−1 and x_center+1~x represent the adjacent pixels of the center pixel.

The above equation indicates that the pixel on the left hand side of the center pixel P25, for example, P24~P23 (x~x_center−1), is determined to be either an actual pixel or noise. If the pixel P24 has pre_Pixel_Flag=1, the pixel flags of the pixels P23 and P24 are both 1. If P23 has pre_Pixel_Flag=1 and P24 has pre_Pixel_Flag=0, it indicates that the edge or boundary of the image at P24 is discontinued (broken). The pixel on the right hand side of the center pixel P25, for example, P26~P27 (x_center+1~x), is determined to be either an actual pixel or noise and which pixel has the maximum pre pixel flag Pre_Pixel_Flag is determined. If P26 has pre_Pixel_Flag=1, the pixel flags of P26 and P27 are both set to 1. If P27 has pre_Pixel_Flag=1 and P26 has pre_Pixel_Flag=0, it indicates that the edge or boundary of the image at P26 is discontinued (broken).

The example using the center pixel P25 will be illustrated. As the pixels P24 and P26 are both labeled with pre pixel flags Pre_Pixel_Flag and are maximum according to the criteria of the flag labeling (b) step, it is determined that the center pixel P25 is a real pixel value but not a noise. Thus, a proper flag is labeled to indicate the pixel is not a noise.

Please note that, according to the above method, the flag value of each pixel in the image signal Vi is labeled; or the pixel indicating non-noise is labeled and the pixel indicating a noise is not labeled so that a flag distribution signal Fs is generated to output to the spatial de-noise filter 23.

It should be noted that the reason of using the way of calculating two points (pixels) is because the probability of only one pixel being the border or boundary is low and thus the method of comparing two or more than two pixels is adapted. If two or more than two pixels are both satisfied, it is sure that the center pixel P25 is the border or boundary but not a noise. If only one point (pixel) on the right or left hand side is satisfied, the pixel value of the center pixel P25 may be a noise and thus the center pixel P25 is determined to be a noise. The embodiment of the invention uses the method of considering the state of the adjacent pixels toward the right or left hand side of the center pixel. In another embodiment, the method of considering the state of the adjacent pixels toward the upper or lower side of the center pixel or toward other angles, such as 45 degrees, may be used.

Furthermore, the spatial de-noise filter 23 receives the input image signal Vi and the flag distribution signal Fs, and changes the pixel values of the input image signal Vi according to the flag values of the flag distribution signal Fs so as to generate an output image signal Vo.

In an embodiment, the spatial de-noise filter 23 may select a preset region in the frame of the input image signal Vi, such as the preset region "b" shown in FIG. 2C, and separately perform a filtering process for each region.

Using divided regions as an example, the operation method processed the spatial de-noise filter 23 is described as follows:

The filtering step (a): selecting a region having a preset size from the input image signal Vi, for example, a 3*9 region shown in FIG. 2C.

The filtering step (b): taking the pixel P25 as the center pixel and changing the weight W of each pixel according to the pixel flag Pixel_Flag labeled by the flag distribution signal Fs generated by the noise detector 22.

The filtering step (c): generating output pixel data by multiplying each pixel of the region with its weight. In one embodiment, the output pixel data is calculated from the following equation:

$$outputpixel(i, j) = \frac{\sum_N W(i+k, j+l) \times \text{pixel}(i+k, j+l)}{\sum_N W(i+k, j+l)} + 0.5 \quad (4)$$

where outputpixel(i,j) is the output pixel data, W(i+k, j+l) is the weight, and pixel((i+k, j+l) is the pixel value.

The filtering step (d): back to the filtering step (a) until the output pixel data of all the pixels are calculated to generate the output image signal Vo.

It should be noted that according to the design of the weight in the spatial de-noise filter 23 according to the embodiments, in the case of calculating the pixel value of P25, the weight is set to 0 if the pixel is considered the border or boundary in the region "b" and the weight is set to be larger if the pixel having a pixel value closer to that of P25. For example, if the pixels P24 and P23 are the border or boundary, the weights which P24 and P23 are multiplied by are smaller, for example, multiplied by 0. On the other hand, if the pixel has a pixel value closer to that of P25, the weight is set to be larger. Finally, the required pixel value of P25 is calculated to remove pixel noises and to clearly show the pixels having the border or boundary. Thus, the image details can be preserved and the noises are filtered.

It should be noted that the pixel value of the above pixel may be all kinds of the current format, such as Ycrcb, Yprpb, RGB, etc, or future developed format.

Figure 3:
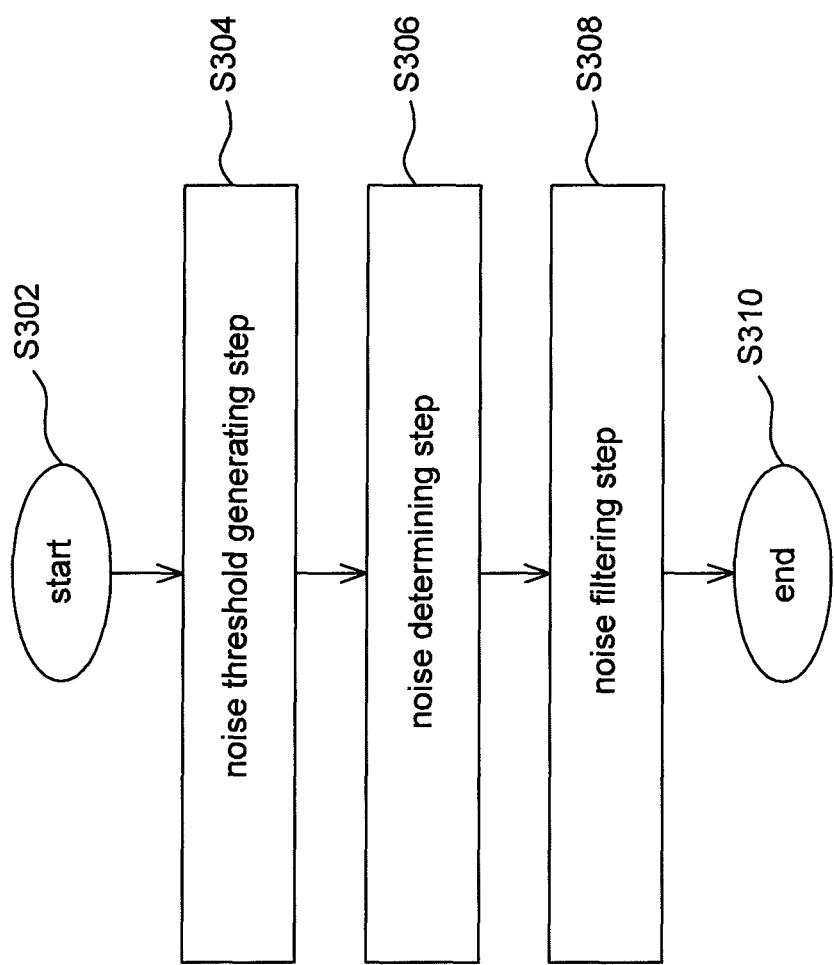
FIG. 3 shows a flow chart illustrating a spatial noise reducing method according to one embodiment of the invention.

FIG. 3 shows a flow chart illustrating a spatial noise reducing method according to one embodiment of the invention. The method comprises the following steps:

Step S302: start;

Step S304: a noise threshold generating step, for estimating each pixel of an input image signal to separately output a local variance value of each pixel and generating a noise threshold according to the state of the local variance values;

Step S306: a noise determining step, for determining whether a pixel indicates a noise or image according to the noise threshold;

Step S308: a noise filtering step, for filtering out the pixel(s) indicating a noise to generate an output image signal;

Step S310: end.

It should be noted that in an embodiment, the noise threshold generating step S304 may further include the following step: acquiring one maximum local variance value from the local variance values, calculating an average local variance value, and then comparing the ratio of the maximum local variance value to the average local variance value with a preset value to determine the state of the local variance values.

In an embodiment, the noise determining step S306 may further includes the following step: setting each pixel as the central pixel and comparing the local variance values of at least two consecutive adjacent pixels of the central pixel with the noise threshold to determine the central pixel is either a noise or image according to the comparison result.

In another embodiment, the noise determining step S306 may further includes the following step: setting each pixel as the central pixel and determining whether the local variance value of the pixel in at least two consecutive adjacent pixels nearest the central pixel is larger than the local variance values of the other pixels or not to thereby determine the central pixel is either a noise or image according to the comparison result.

The image processing system and the spatial noise reducing method according to the invention utilize the local variance values of each pixel and its adjacent pixels to perceive the degree of variance between pixels in the whole image and then use the degree of variance to determine that each pixel is either on the border/boundary or a noise. Then, the weight of each pixel is adjusted correspondingly to thereby eliminate noises and enhance the border or boundary of the image so that the problem in the prior art can be solved and the effect of eliminating noises and keeping image details at the same time can be achieved.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A non-transitory computer-readable medium that stores processor executable instructions of an image processing system, the image processing system comprising:

an local variance estimator, for estimating each pixel of an input image signal to separately output a local variance value of each pixel of the input image signal, and generating a noise threshold according to the state of the local variance values;

a noise detector, coupled to the local variance estimator, for determining whether a pixel of the input image signal indicates a noise or an image according to the noise threshold; and a spatial de-noise filter, coupled to the noise detector, for filtering out the pixels indicating noises to generate an output image signal;

wherein the state of the local variance value is determined by the maximum local variance value of all the pixels or part of the pixels of the input image signal, and the average local variance value of all the pixels or part of the pixels of the input image signal;

wherein the local variance estimator compares the maximum local variance value with the average local variance value to acquire a first ratio, and then compares the first ratio with a preset value to thereby use the comparison result to determine the noise threshold.

2. The system according to claim 1, wherein the local variance value represents the degree of variance between each pixel and its adjacent pixels.

3. The system according to claim 1, wherein the noise detector further sets each pixel of the input image signal as a central pixel, and compares the local variance values of at least two consecutive adjacent pixels of the central pixel with the noise threshold to determine the central pixel is either a noise or image according to the comparison result.

4. The system according to claim 3, wherein if the local variance values of the two consecutive adjacent pixels are both larger than the noise threshold, the central pixel is considered as an image; and if one of the local variance values of the two consecutive adjacent pixels is smaller than the noise threshold, the central pixel is considered as a noise.

5. The system according to claim 1, wherein the noise detector further sets each pixel of the input image signal as a central pixel, wherein a first pixel in at least two consecutive adjacent pixels nearest the central pixel has a first local variance value and a second pixel in at least two consecutive adjacent pixels has a second local variance value; and the noise detector determines whether the first local variance value is larger than the second local variance value or not to thereby determine the central pixel is either a noise or image according to the comparison result.

6. The system according to claim 1, wherein the noise detector further sets each pixel of the input image signal as a central pixel, and if the local variance value of the pixel nearest the central pixel is larger than the local variance values of the other consecutive adjacent pixels, the central pixel is considered as an image; and if the local variance value of the pixel nearest the central pixel is smaller than the local variance values of the other consecutive adjacent pixels, the central pixel is considered as a noise.

7. The system according to claim 1, wherein the spatial de-noise filter multiplies the pixel value of the pixel with a preset weighting value according to whether the pixel is a noise or image.

8. A spatial noise reducing method, comprising:
a noise threshold generating step, for estimating each pixel of an input image signal to separately output a local variance value of each pixel of the input image signal, and generating a noise threshold according to the state of the local variance values;
a noise determining step, for determining which pixel of the input image signal indicates a noise or image according to the noise threshold; and
a noise filtering step, for filtering out the pixel(s) indicating a noise to generate an output image signal;
wherein the noise threshold generating step further comprises:
acquiring one maximum local variance value from the local variance values, calculating an average local variance value from the local variance values, and then comparing the ratio of the maximum local variance value to the average local variance value with a preset value to determine the state of the local variance values.

9. The method according to claim 8, wherein the noise determining step further comprises:
setting each pixel of the input image signal as the central pixel and comparing the local variance values of at least two consecutive adjacent pixels of the central pixel with the noise threshold to determine the central pixel is either a noise or image according to the comparison result.

10. A non-transitory computer-readable medium that stores processor executable instructions of an image processing system, the image processing system comprising:
an local variance estimator, for estimating each pixel of an input image signal to separately output a local variance value of each pixel of the input image signal, and generating a noise threshold according to the state of the local variance values;
a noise detector, coupled to the local variance estimator, for determining whether a pixel of the input image signal indicates a noise or an image according to the noise threshold; and
a spatial de-noise filter, coupled to the noise detector, for filtering out the pixels indicating noises to generate an output image signal;
wherein the noise detector further sets each pixel of the input image signal as a central pixel, and compares the local variance values of at least two consecutive adjacent pixels of the central pixel with the noise threshold to determine the central pixel is either a noise or image according to the comparison result;
wherein if the local variance values of the two consecutive adjacent pixels are both larger than the noise threshold, the central pixel is considered as an image; and if one of the local variance values of the two consecutive adjacent pixels is smaller than the noise threshold, the central pixel is considered as a noise.

11. A non-transitory computer-readable medium that stores processor executable instructions of an image processing system, the image processing system comprising:
an local variance estimator, for estimating each pixel of an input image signal to separately output a local variance value of each pixel of the input image signal, and generating a noise threshold according to the state of the local variance values;
a noise detector, coupled to the local variance estimator, for determining whether a pixel of the input image signal indicates a noise or an image according to the noise threshold; and
a spatial de-noise filter, coupled to the noise detector, for filtering out the pixels indicating noises to generate an output image signal;
wherein the noise detector further sets each pixel of the input image signal as a central pixel, wherein a first pixel in at least two consecutive adjacent pixels nearest the central pixel has a first local variance value and a second pixel in at least two consecutive adjacent pixels has a second local variance value; and the noise detector determines whether the first local variance value is larger than the second local variance value or not to thereby determine the central pixel is either a noise or image according to the comparison result.

12. A non-transitory computer-readable medium that stores processor executable instructions of an image processing system, the image processing system comprising:
an local variance estimator, for estimating each pixel of an input image signal to separately output a local variance value of each pixel of the input image signal, and generating a noise threshold according to the state of the local variance values;
a noise detector, coupled to the local variance estimator, for determining whether a pixel of the input image signal indicates a noise or an image according to the noise threshold; and
a spatial de-noise filter, coupled to the noise detector, for filtering out the pixels indicating noises to generate an output image signal;
wherein the noise detector further sets each pixel of the input image signal as a central pixel, and if the local variance value of the pixel nearest the central pixel is larger than the local variance values of the other consecutive adjacent pixels, the central pixel is considered as an image; and if the local variance value of the pixel nearest the central pixel is smaller than the local variance values of the other consecutive adjacent pixels, the central pixel is considered as a noise.

13. A spatial noise reducing method, comprising:
a noise threshold generating step, for estimating each pixel of an input image signal to separately output a local variance value of each pixel of the input image signal, and generating a noise threshold according to the state of the local variance values;
a noise determining step, for determining which pixel of the input image signal indicates a noise or image according to the noise threshold; and
a noise filtering step, for filtering out the pixel(s) indicating a noise to generate an output image signal;
wherein the noise determining step further comprises:
setting each pixel of the input image signal as the central pixel, wherein a first pixel in at least two consecutive adjacent pixels nearest the central pixel has a first local variance value and a second pixel in at least two consecutive adjacent pixels has a second local variance value; and determining whether the first local variance value is larger than the second local variance value or not to thereby determine the central pixel is either a noise or image according to the comparison result.

* * * * *